Nov. 27, 1962 R. D. GIBNEY 3,065,648
SLACK ADJUSTER HOUSING NUT
Filed Aug. 29, 1958
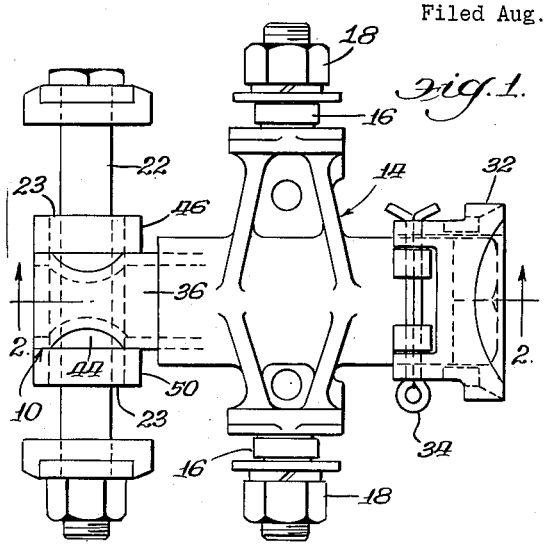
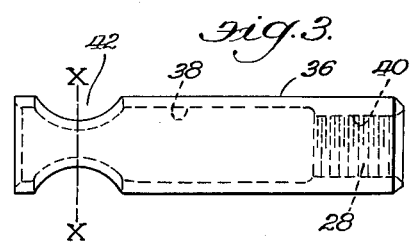
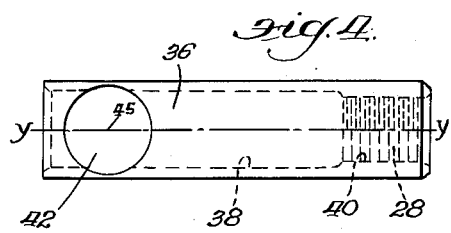
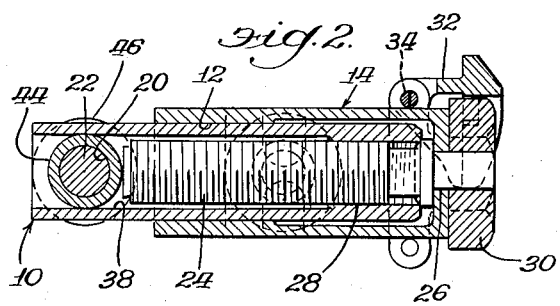
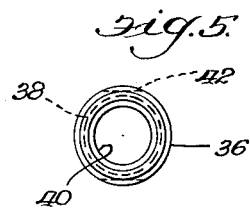
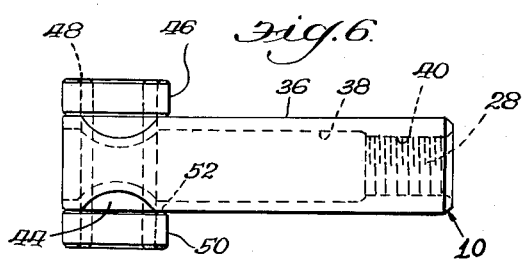
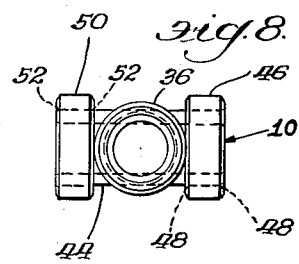
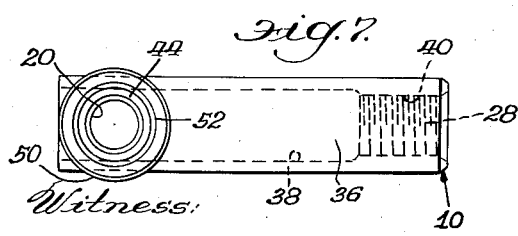
Inventor:
Robert D. Gibney
By: Walter S. Schlegel, Jr.
Atty.

United States Patent Office 3,065,648
Patented Nov. 27, 1962

3,065,648
SLACK ADJUSTER HOUSING NUT
Robert D. Gibney, Munster, Ind., assignor to Amsted Industries Incorporated, Chicago, Ill., a corporation of New Jersey
Filed Aug. 29, 1958, Ser. No. 758,136
10 Claims. (Cl. 74—509)

This invention relates to slack adjusters for railway brake rigging and more particularly to a novel nut, and method of making, such as is commonly used in a manual slack adjuster of this type.

A primary object of the invention is to devise a nut which is economical to manufacture and has the capacity for long life under the impacts and vibrations of railway service.

A more specific object of the invention is to fabricate a nut from parts which can be quickly and economically produced in a machine shop as distinguished from prior art nuts formed from castings.

A further object of the invention is to provide a foolproof assembly which can be fabricated by an unskilled operator with minimum risk of damage to the component parts.

The foregoing and other objects and advantages of the invention will become apparent from a consideration of the following specification and the accompanying drawings, wherein:

FIGURE 1 is a general assembly top plan view of a railway slack adjuster embodying a preferred form of the novel nut;

FIGURE 2 is a sectional view on line 2—2 of FIGURE 1;

FIGURE 3 is a top plan view of the longitudinal member of the nut;

FIGURE 4 is a side elevational view thereof;

FIGURE 5 is an end elevational view taken from the right as seen in FIGURES 3 and 4;

FIGURE 6 is a top plan view of the novel nut;

FIGURE 7 is a side elevational view thereof; and

FIGURE 8 is an end elevational view taken from the right as seen in FIGURES 6 and 7.

Describing the invention in detail and referring first to FIGURES 1 and 2, the novel slack adjuster housing nut generally designated 10 is slidably mounted at 12 in a body 14 which may be formed as a casting comprising trunnions 16 with nuts 18 threaded thereon to maintain a brake lever or levers (not shown) on the trunnions which are received within complementary openings of the lever or levers.

The novel nut 10 comprises a transverse bore or aperture 20 for the reception of a bolt and nut assembly 22 to maintain brake lever connector straps (not shown) in snug abutment with oppositely facing seats 23 at one end of the nut.

The distance between the trunnions 16 and the bolt and nut assembly 22 is adjusted during adjustment of slack in the brake rigging (not shown) by a screw 24 rotatably journaled at 26 in the body 14 and in threaded engagement at 28 with the novel nut 10.

A hexagonal head 30 is shrunk on the screw 24 for convenient actuation thereof, and a releaseable lock or latch 32 is pivoted as by a cotter 34 to the body, to lock the screw against accidental rotation due to impacts and vibration under railway service conditions.

Referring now to FIGURES 3 to 8, the novel nut 10 will be described in detail by describing the novel method of fabricating this part.

An elongated member 36 preferably in the form of a segment of cylindrical bar stock is first drilled to provide an elongated passage 38 extending lengthwise of the member. A drilling tool is then advanced through the passage 38 to form a passage 40 which is preferably of smaller diameter than passage 38. The passage 40 is then threaded at 28. A transverse passage 42 is then drilled through the member 36 adjacent its end remote from the threads 28, the passage 42 being of greater diameter than the passage 38, as best seen in FIGURE 4, to afford maximum bearing for a tube 44 which is press-fitted in the passage 42 with the ends of the tube projecting therefrom.

The axis X—X (FIG. 3) of passage 42 intersects axis Y—Y (FIG. 4) of passage 38, as at 45 (FIG. 4) so that the top and bottom of tube 44 bear continuously against the member 36 within the passage 42.

A washer 46 having an inner diameter chamfered or flared at 48 is then press-fitted on one end of the tube preferably until the washer bears snugly against the member 36 without crushing or otherwise deforming the latter. A second washer 50 preferably identical with washer 46 and having an inner diameter chamfered or flared at 52 is then press-fitted on the opposite end of the tube preferably until the washer 48 bears snugly against the member 36 without crushing or otherwise deforming the latter. It has been discovered according to the invention that the washers are preferably press-fitted one at a time on the tube 44 as above described so that the operator who assembles the novel nut can do so without crushing the member 36 as the washers are press-fitted into assembled positions shown in FIGURES 6 to 8.

The chamfered or flared inner diameters of the washers function as guides to ensure a proper fit of the washers on the tube 44, inasmuch as the slightest deviation from a coaxial relationship between the tube and washers may result in crushing of the member 38 by one edge of a washer.

What is claimed is:

1. A slack adjuster nut to be used with an associated adjusting screw for a railway car brake rigging comprising; an elongated member having a longitudinal passage, an internally threaded portion of said elongated member within said longitudinal passage, said threaded portion having a diameter smaller than that of the remaining portion of said longitudinal passage, a transverse passage through said member of greater diameter than that of the longitudinal passage, the longitudinal axes of said passages intersecting, a tube rigidly fitted in the transverse passage to close said longitudinal passage and washers rigidly fitted on the ends of the tube, said longitudinal passage being adapted to engage a portion of said adjusting screw within said threaded portion thereof and also to, at times, enclose the inward end portion of said adjusting screw, without engagement therewith, between said threaded portion and said tube.

2. A slack adjuster nut for a brake rigging assembly comprising a cylindrical member having a longitudinal passage communicating with the ends thereof, a threaded portion within said longitudinal passage adjacent one end thereof, a transverse passage through said member of greater diameter than that of said longitudinal passage, the longitudinal axes of said passages intersecting, said transverse passage disposed between said threaded portion and the other end of said longitudinal passage, a tube rigidly press-fitted in the transverse passage to divide said longitudinal passage into two parts, washers rigidly press-fitted on the ends of said tube, and means extending through the tube and projecting from both ends thereof for connection to associated brake rigging.

3. A slack adjuster nut for a brake rigging assembly comprising a cylindrical member having a threaded longitudinal passage therethrough, a transverse passage through said member, the longitudinal axes of said passages intersecting, a tube rigidly press-fitted into the transverse passage thereby dividing and obstructing said longitudinal passage, said transverse passage being of greater diameter than said longitudinal passage to afford maximum bearing area between said tube and said transverse passage, washers press-fitted on the ends of the tube, and means extending through the tube and projecting from both ends thereof for connection to associated brake rigging.

4. In a slack adjuster for a railway brake rigging, a housing having a cylindrical bore, a screw journaled in said housing at the inner end of said bore and coaxial therewith for rotational and non-axial movement relative to said housing, a nut comprising a length of tubing having its outer surface in snug sliding engagement in said bore and its inner surface in threaded engagement with said screw, said nut having an outer end portion extending from the outer end of said bore and provided with a transverse opening of greater diameter than the inner diameter of the nut, and a tubular member mounted in said transverse opening to close said outer end portion of the nut to prevent the passage of dirt therethrough.

5. In a slack adjuster for a railway brake rigging, a housing having a cylindrical bore, a screw journaled in said housing at the inner end of said bore and coaxial therewith for rotational and no-axial movement relative to said housing, a nut comprising a length of tubing having its outer surface in snug sliding engagement in said bore and its inner surface in threaded engagement with said screw, said nut having an outer end portion extending from the outer end of said bore and provided with a transverse opening of greater diameter than the inner diameter of the nut, a tubular member mounted in said transverse opening to close said outer end portion of the nut to prevent the passage of dirt therethrough, the ends of said tubular member projecting from opposite sides of said nut, and washers mounted on said ends.

6. In a slack adjuster for a railway brake rigging, a housing having a cylindrical bore, a screw journaled in said housing at the inner end of said bore and coaxial therewith for rotational and non-axial movement relative to said housing, a nut comprising a length of tubing having its outer surface in snug sliding engagement in said bore and its inner surface in threaded engagement with said screw, said nut having an outer end portion extending from the outer end of said bore and provided with a transverse opening of greater diameter than the inner diameter of the nut, a tubular member mounted in said transverse opening to close said outer end portion of the nut to prevent the passage of dirt therethrough, the ends of said tubular member projecting from opposite sides of said nut, washers mounted on said ends, said tubular member being in press-fit engagement on said nut, said washers being in press-fit engagement on said tubular member, and means operable to rotate said screw.

7. In a slack adjuster for a railway brake rigging, a housing having a cylindrical bore, a screw journaled in said housing at the inner end of said bore and coaxial therewith for rotational and non-axial movement relative to said housing, a nut comprising a length of tubing having its outer surface in snug sliding engagement in said bore and its inner surface in threaded engagement with said screw, said nut having an outer end portion extending from the outer end of said bore and provided with a transverse opening of greater diameter than the inner diameter of the nut, a tubular member mounted in said transverse opening to close said outer end portion of the nut to prevent the passage of dirt therethrough, the ends of said tubular member projecting from opposite sides of said nut, washers mounted on said ends, said tubular member being in press-fit engagement on said nut, said washers being in press-fit engagement on said tubular member, means operable to rotate said screw, and a bolt journaled in said tubular member.

8. In a slack adjuster for a railway brake rigging, a tubular housing having a cylindrical bore terminating at an end wall provided with a bearing aperture, a screw having one end thereof extending within said bore and its other end journaled for rotational and non-axial movement in said bearing aperture, a tubular nut mounted for snug telescopic movement within the bore of said housing and having one end thereof in threaded engagement with said screw, the other end of said tubular nut projecting from said housing and having a transverse opening of greater diameter than the inner diameter of the nut, and a tubular member snugly engaged in said transverse opening to close said other end of said nut to prevent the passage of dirt therethrough into the interior of the nut.

9. In a slack adjuster for a railway brake rigging, a tubular housing having a cylindrical bore terminating at an end wall provided with a bearing aperture, a screw having one end thereof extending within said bore and its other end journaled for rotational and non-axial movement in said bearing aperture, a tubular nut mounted for snug telescopic movement within the bore of said housing and having one end thereof in threaded engagement with said screw, the other end of said tubular nut projecting from said housing and having a transverse opening of greater diameter than the inner diameter of the nut, a tubular member snugly engaged in said transverse opening to close said other end of said nut to prevent the passage of dirt therethrough into the interior of the nut, and washers secured to the ends of said tubular member.

10. In a slack adjuster for a railway brake rigging, a tubular housing having a cylindrical bore terminating at an end wall provided with a bearing aperture, a screw having one end thereof extending within said bore and its other end journaled for rotational and non-axial movement in said bearing aperture, a tubular nut mounted for snug telescopic movement within the bore of said housing and having one end thereof in threaded engagement with said screw, the other end of said tubular nut projecting from said housing and having a transverse opening of greater diameter than the inner diameter of the nut, a tubular member snugly engaged in said transverse opening to close said other end of said nut to prevent the passage of dirt therethrough into the interior of the nut, washers secured to the ends of said tubular member, and a bolt journaled in said tubular member.

References Cited in the file of this patent

UNITED STATES PATENTS

| | | |
|---|---|---|
| 519,458 | Shepheard | May 8, 1894 |
| 1,157,666 | Bennett | Oct. 26, 1915 |
| 1,578,434 | Hansen | Mar. 3, 1926 |
| 2,239,651 | McMurrae et al. | Apr. 22, 1941 |
| 2,448,329 | Schwinn | Aug. 31, 1948 |
| 2,465,734 | Lewin | Mar. 29, 1949 |
| 2,555,124 | Gothberg | May 29, 1951 |
| 2,614,827 | Peach et al. | Oct. 21, 1952 |
| 2,636,254 | Gunning | Apr. 28, 1953 |
| 2,679,764 | Kowalik | June 1, 1954 |